Nov. 8, 1938.   R. S. RICHARDSON   2,135,733
NITRIC ACID MANUFACTURE
Filed Aug. 29, 1934
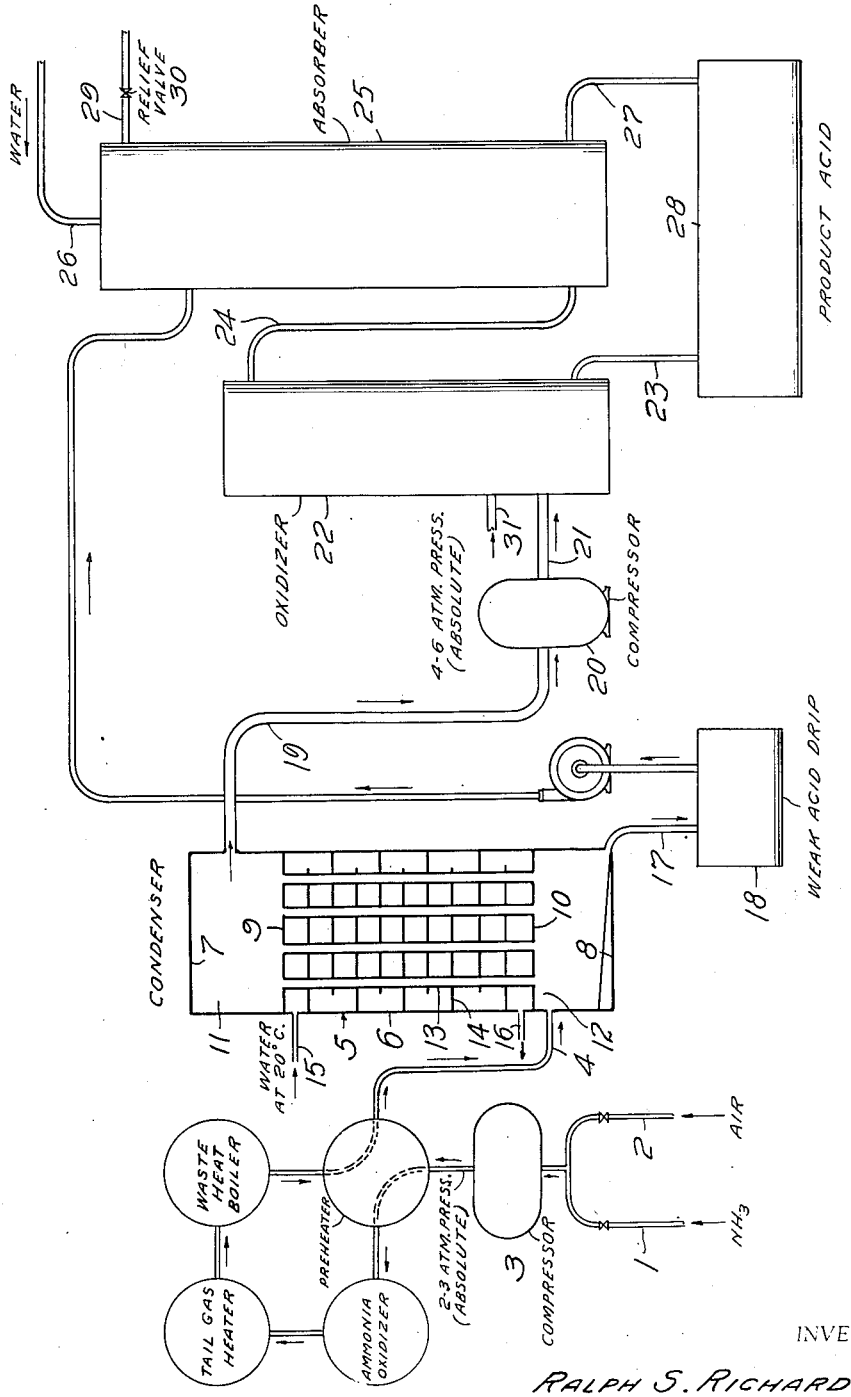
INVENTOR.
RALPH S. RICHARDSON,
BY
Wm. P. Spielman
ATTORNEY.

Patented Nov. 8, 1938

2,135,733

UNITED STATES PATENT OFFICE 2,135,733

NITRIC ACID MANUFACTURE

Ralph S. Richardson, Scarsdale, N. Y., assignor to Chemical Construction Corporation, a corporation of Delaware Application August 29, 1934, Serial No. 741,984

6 Claims. (Cl. 23—162)

This invention relates to an apparatus and process for the production of nitric acid, and more particularly to a system for producing such acid from gases obtained by the oxidation of ammonia under pressure.

The oxidation of ammonia with air or other oxygen containing gases in the presence of a platinum catalyst is now carried out on a large scale, and the characteristics of this reaction, which may be represented by the equation (1) $\quad 4NH_3 + 5O_2 = 6H_2O + 4NO$ are well known. It will be seen from the above equation that it is one which is not favored by high pressures; on the contrary the reaction equilibrium is more favorable at relatively low pressures than at higher ones.

Most of the processes now in use for obtaining nitric acid from the gaseous products of this reaction involve, in general, the successive steps of cooling the gases, permitting the NO to oxidize to $NO_2$ either by the excess oxygen contained in the gases or by the addition of oxygen, and the final step of absorbing the oxidized gases in an aqueous absorbing medium such as water or dilute nitric acid. The reactions involved in these steps are as follows:

(2) $\quad 2NO + O_2 = 2NO_2$
(3) $\quad 3NO_2 + H_2O = 2HNO_3 + NO$ and it will be seen that these are both reactions, the equilibrium of which is favored by increased pressure since they take place with diminution of volume.

It is now standard practice to carry out the above series of reactions in a system operating under atmospheric pressure, only sufficient draft being used to force the gases through the apparatus. This method of operation results in a highly favorable equilibrium of reaction 1 above, but the pressure conditions are not the most favorable for reactions 2 and 3 and it is difficult to obtain acid of a concentration higher than 50% from the remaining two reactions without the use of refrigeration or other artificial temperature control.

It has also been proposed to operate the entire system under a considerable pressure, in order to obtain a more favorable equilibrium for reactions 2 and 3 and a product acid of increased concentration. It must be noted, however, that the increased efficiency in the absorption end of the system takes place only with a corresponding displacement of equilibrium in the ammonia oxidation reaction, and the incomplete conversion lowers the strength of the acid produced by a corresponding amount, besides representing a loss of efficiency and a source of impurity in the product.

In view of the disadvantages in the ordinary pressure systems, it has recently been proposed to use superatmospheric pressures only in the absorption end of the system, that is to say, to carry out the ammonia oxidation at atmospheric or subatmospheric pressure followed by compression of the nitric oxide gases and absorption under pressures higher than atmospheric. While from a theoretical standpoint the conditions so obtained are favorable to the various reactions, from a practical standpoint of plant construction and operation, such a system presents a number of difficulties.

The present invention relates to a nitric acid plant in which substantially all the advantages of pressure operation are obtained without the disadvantages noted above. I have found that the equilibrium of the reaction (1) $\quad 4NH_3 + 5O_2 = 6H_2O + 4NO$ is only slightly displaced to the left by a first moderate increase of pressure above atmospheric and that the loss of efficiency represented by an increase of pressure of approximately 1 to 2 atmospheres, i. e., an operating pressure of approximately 2 to 3 atmospheres absolute, is practically compensated by the corresponding decrease in the undesirable side reaction:

(4) $\quad 4NH_3 + 3O_2 = 2N_2 + 6H_2O$

A comparison of the equilibria and optimum conditions of these two reactions shows that there is a super-atmospheric pressure range of from 1 to approximately 3 atmospheres within which the efficiency of the ammonia oxidation, expressed in moles NO obtained per mole of ammonia introduced, is well within the permissible conversion efficiency for plants of this type. Above pressures of approximately 3 atmospheres, or 45 pounds per square inch absolute, the equilibrium of reaction 1 becomes unfavorably displaced, so that operation above this point represents a loss in efficiency of the entire plant.

An object of the present invention, therefore, is the provision of a superatmospheric system for the production of nitric acid involving only such a preliminary compression of gases in the ammonia oxidation stage that the reaction is not unfavorably affected thereby.

A further object is the subsequent compression of the oxidized gases to pressures suitable for absorption with the production of a nitric acid product of relatively high concentration.

A final object includes apparatus for the production of nitric acid by oxidation of ammonia-containing gases under relatively low superatmospheric pressures followed by absorption in an aqueous absorbing medium at higher pressures. Further objects of the invention will be in part made apparent from the following description and in part pointed out in the appended claims.

The invention will be further illustrated by reference to the accompanying drawing, which is a diagrammatic representation of a nitric acid plant construction in accordance with the principles thereof. In this drawing, the first stages of the system are represented in the conventional manner by circles, including the customary preheater for the ammonia-air mixture, the ammonia oxidizer in which the preheated mixture is passed over a platinum gauze catalyst at temperatures of 600–900° C., the tail gas heater and waste heat boiler for utilizing the excess heat of the nitric oxide gases coming from the converter, and the preheater referred to in which these gases are passed in heat exchanging relation with the incoming gases.

The ammonia and air are admitted to the system through valved pipes 1 and 2 and pass to the compressor 3, which is of a design and construction suitable for compressing the gases to 2 to 3 atmospheres absolute pressure. From the compressor the gases pass along the course shown by the arrows, and preferably leave the preheater at a temperature of approximately 250° C. The gases then pass through pipe 4 into the condenser 5 which, as shown, is of relatively large size and is capable of such rapid cooling that the water produced by oxidation of the ammonia is condensed and removed before the NO in the gases has had time to oxidize to $NO_2$ and be absorbed in the condensate.

The rapidity of cooling is primarily desirable to produce more concentrated $NO_2$ gases for the absorber. Since the weak acid drip from the condenser may be used for irrigating the absorber, as illustrated in the drawing, the question is merely one of the strength of the product acid desired and not one of loss of oxides of nitrogen from the system.

Preferably this condenser is of such a type that the condensate runs counter-current to the gases, so that it leaves as weak nitric acid at equilibrium with the gases entering the condenser. The condenser shown is one of the tubular type, consisting of an outer shell 6 with top and bottom pieces 7 and 8 and tube sheets 9 and 10 forming gas exit and entrance compartments 11 and 12. Between the tube sheets are mounted gas tubes 13, and around these tubes are placed horizontal baffles 14, to provide an extended travel over the tubes for the cooling water which enters at 15 and leaves at 16. The weak acid collected as condensate runs off through the pipe 17 and is collected in storage tank 18, from which it may be pumped to the absorbers if desired.

The gases leaving the exit compartment 11 of the condenser are at approximately the temperature of the cooling water used, which is about 20° C., and are saturated with water at this temperature under the pressure employed. At this point, there are several alternative procedures which may be adopted, depending upon the type and size of the plant and the product desired. In a plant operating to produce a 60 to 65% nitric acid, a small chromium steel compressor 20 may be provided, to raise the total pressure to an absorption range of 4 to 7 atmospheres absolute, and preferably to an operating range of approximately 5 atmospheres.

Since this compressor must do only a relatively smaller part of the work required of compressors located at this point in the prior system above referred to and since due to prior compression the actual volume of gases entering the compressor is smaller, its size and installation cost are correspondingly decreased.

The gases from the condenser are passed through the pipe 19, to a compressor 20 which may be constructed of chrome steel. While this compressor is preferably of a size and construction to compress the gases from their first stage pressure to an absorbing pressure of 4 to 6 atmospheres, which is suitable for the production of an acid of 60 to 65% concentration with ordinary cooling water, it is understood that higher pressures may be employed in the absorption stage if desired. For example, a compressor may be used, preferably provided with a cooling jacket and means for further cooling the gases after compression, which will compress the oxides of nitrogen to such an extent that they may be directly condensed as liquid $N_2O_4$, which is suitable for reacting with oxygen and water under pressure to produce nitric acid of any desired strength. Pressures up to 30 atmospheres absolute have been used for this purpose, and are included in the present invention.

From the compressor, the gases now pass through pipe 21 to an oxidizer 22, in which the reaction $$2NO + O_2 = 2NO_2$$

is brought to completion. By reason of the increased pressure this reaction takes place at greater speed than in the ordinary atmospheric plants. The amount of acid drip formed is less than in prior processes because of the greater removal of water in the primary condensers due to the gas being under pressure. It is to be understood that the term "absorbing system" is intended to include an absorber either with or without an intermediate oxidizer or cooler, as volume must always be allowed for oxidation of NO to $NO_2$ either as an oxidizer or else in the base of the absorption tower. In any case, gases leaving compressor 20 must be cooled to remove heat of compression and to obtain the lower temperatures where oxidation is more rapid. By admitting additional air or oxygen to the oxidizer as at 31, it is possible to operate with a correspondingly decreased excess of air in the ammonia oxidizer, which decreases the rate of oxidation of NO during the cooling stage.

The gases leaving the oxidizer are passed through pipe 24 into the base of the absorbing tower 25, through which they rise counter to a flow of an aqueous absorbing medium such as water or dilute nitric acid which is admitted at the top through pipe 26. Concentrated nitric acid so produced is collected from the base of the tower through pipe 27 and is run to storage tank 28, while the tail gases are vented from the system through exit pipe 29 provided with relief valve 30. In commercial practice these tail gases, instead of being vented, are frequently passed to a tail gas heater placed in the system directly after the ammonia oxidizer, as indicated in the drawing, and are then expanded in an expansion engine in order to utilize the energy which they contain. This expansion engine is used to drive the compressors 3 and 20, or for any other purpose where work is required, and this practice may be followed in the operation of the present invention if desired.

From the above, it will be apparent that a nitric acid system has been designed which gives at least the efficiency of one in which the ammonia oxidation takes place at atmospheric pressure followed by compression and absorption under pressures greater than atmospheric, while maintaining the lower plant cost of an all pressure system. This is highly desirable.

While the invention has been shown and described with reference to particular embodiments, yet, obviously, I do not wish to be limited thereto, but the invention is to be construed broadly and restricted only by the scope of the claims.

I claim:

1. A process of producing nitric acid which comprises compressing ammonia and oxygen containing gases to pressures substantially above atmospheric but not substantially greater than 45 pounds per square inch absolute, bringing about oxidation in the gases at these pressures to produce gases containing nitric oxide, and both oxidizing said nitric oxide to higher oxides of nitrogen and absorbing said oxides of nitrogen from the reacted gases in an aqueous absorbing medium under pressures substantially greater than those employed in the oxidation step.

2. A process of producing nitric acid which comprises compressing ammonia and oxygen containing gases to pressures substantially above atmospheric but not substantially greater than 45 pounds per square inch absolute, bringing about oxidation in the gases at these pressures to produce gases containing nitric oxide, and both oxidizing said nitric oxide to higher oxides of nitrogen and absorbing said oxides of nitrogen from the reacted gases in an aqueous absorbing medium under pressures greater than 60 pounds per square inch absolute.

3. A process of producing nitric acid which comprises compressing ammonia and oxygen containing gases to pressures substantially above atmospheric but not substantially greater than 45 pounds per square inch absolute, bringing about oxidation in the gases at these pressures and at elevated temperatures to produce hot gases containing nitric oxide, cooling the reacted gases to condense water therefrom, and both oxidizing said nitric oxide to higher oxides of nitrogen and absorbing said oxides of nitrogen from the reacted gases in an aqueous absorbing medium under pressures substantially greater than those employed in the oxidation step.

4. A process of producing nitric acid which comprises compressing ammonia and oxygen containing gases to pressures substantially above atmospheric but not substantially greater than 45 pounds per square inch absolute, bringing about oxidation in the gases at these pressures and at elevated temperatures to produce hot gases containing nitric oxide, cooling the reacted gases at these pressures to condense a major part of the water therefrom, compressing to a still higher pressure, and oxidizing said nitric oxide to higher oxides of nitrogen and absorbing said oxides of nitrogen from the gases in an aqueous absorbing medium under said higher pressure.

5. A process of producing nitric acid which comprises compressing ammonia and oxygen containing gases to pressures substantially above atmospheric but not substantially greater than 45 pounds per square inch absolute, bringing about oxidation in the gases at these pressures and at elevated temperatures to produce hot gases containing nitric oxide, quickly cooling the reacted gases at these pressures to condense a major part of the water therefrom while passing the condensate counter to the hot gases, compressing the gases to a still higher pressure, and then oxidizing said nitric oxide to higher oxides of nitrogen and absorbing said oxides of nitrogen from the reacted gases in an aqueous absorbing medium under said higher pressure.

6. A nitric acid plant comprising in combination a plurality of gas compressors for ultimately attaining a pressure of at least 4 atmospheres absolute, an ammonia oxidizer, a condenser, an oxidizer, and an absorbing system for contacting gaseous oxides of nitrogen with an aqueous absorbing medium, the first gas compressor being located ahead of the ammonia oxidizer and being operative to produce a pressure substantially above atmospheric but not substantially greater than 45 pounds per square inch absolute, and at least one subsequent gas compressor being located subsequent to the ammonia oxidizer and being operative to compress the oxidized gases to a still higher pressure, said subsequent gas compressor being fabricated from an alloy of iron which is resistant to corrosion by moist oxides of nitrogen.

RALPH S. RICHARDSON.